(12) United States Patent
Mitra et al.

(10) Patent No.: US 6,525,300 B1
(45) Date of Patent: Feb. 25, 2003

(54) COOKING SURFACE FOR COOKING FOOD HAVING A GLASS CERAMIC SURFACE WITH A GLASS COATING THEREON

(75) Inventors: Ina Mitra, Stadecken-Elsheim (DE); Friedrich Siebers, Nierstein (DE); Jutta Reichert, Gräfeling (DE); Cora Krause, Essingen (DE); Otmar Becker, Langen (DE); Michael Bug, Mühltal (DE)

(73) Assignee: Schott Glas, D-55122 Mainz (DE)

( * ) Notice: Subject to any disclaimer, the term of this patent is extended or adjusted under 35 U.S.C. 154(b) by 0 days.

(21) Appl. No.: 09/925,286

(22) Filed: Aug. 9, 2001

Related U.S. Application Data

(63) Continuation of application No. 09/364,479, filed on Jul. 30, 1999, now abandoned.

(51) Int. Cl.$^7$ .............................. H05B 3/68; C03C 8/02
(52) U.S. Cl. ..................................... 219/443.1; 501/21
(58) Field of Search ................... 219/443.1, 452.11, 219/460.01, 546, 547, 548; 428/210, 426, 427, 428; 501/14–18, 21, 22, 23

(56) References Cited

U.S. PATENT DOCUMENTS

| | | | |
|---|---|---|---|
| 4,057,670 A | * 11/1977 | Schneidler | 219/460.1 |
| 4,316,963 A | * 2/1982 | Hommel et al. | 428/428 |
| 5,326,728 A | 7/1994 | Boury et al. | |
| 5,447,891 A | 9/1995 | Spinosa et al. | |
| 5,691,254 A | 11/1997 | Sakamoto et al. | |
| 5,849,649 A | 12/1998 | Poole | |
| 5,866,239 A | * 2/1999 | Shimatani et al. | 428/210 |
| 6,043,171 A | 3/2000 | Siebers et al. | |
| 6,174,608 B1 | * 1/2001 | Bertochhi et al. | 428/426 |

FOREIGN PATENT DOCUMENTS

| | | |
|---|---|---|
| DE | 4201268 | 7/1993 |
| DE | 4241411 | 6/1994 |
| DE | 19512847 | 11/1996 |
| DE | 19721737 | 3/1998 |
| EP | 0220333 | 5/1987 |
| EP | 0460863 | 12/1991 |
| EP | 0509792 | 10/1992 |
| EP | 0771765 | 5/1997 |
| EP | 0776867 | 6/1997 |
| EP | 0879801 | 11/1998 |
| FR | 2732960 | 10/1996 |
| GB | 2301100 | 11/1996 |
| JP | 59203737 | 11/1984 |
| JP | 761837 | 7/1995 |
| JP | 09030834 | 2/1997 |
| JP | 09227152 | 9/1997 |

* cited by examiner

*Primary Examiner*—Sang Paik
(74) *Attorney, Agent, or Firm*—Nils H. Ljungman & Associates

(57) ABSTRACT

The invention relates to lead- and cadmium-free glass for glazing, enamelling and decorating glasses or glass-ceramics which have a low coefficient of thermal expansion of less than $2 \times 10^{-6}$/K, having the composition (in % by weight) 0–6 $Li_2O$, 0–5 $Na_2O$, 0 to less than 2 $K_2O$, where the sum $Li_2O+K_2O+Na_2O$ is between 2 and 12, 0–4 MgO, 0–4 CaO, 0–4 SrO, 0–1 BaO, 0–4 ZnO, 3 to less than 10 $Al_2O_3$, 13–23 $B_2O_3$, 50–65 $SiO_2$, 0–4 $TiO_2$, 0–4 $ZrO_2$ and 0–4 F, as replacement for oxygen and containing up to 30% by weight of a pigment which is resistant at the firing temperature, where the glass is suitable for glazing, enamelling and decoration in both primary and secondary firing, and both the full-area and sparse glaze, enamel or decoration layers have low abrasion susceptibility after firing, and it relates to processes for the production of a glass-ceramic coated therewith.

20 Claims, No Drawings

COOKING SURFACE FOR COOKING FOOD HAVING A GLASS CERAMIC SURFACE WITH A GLASS COATING THEREON

This application is a continuation of U.S. patent application Ser. No. 09/364,479, filed on Jul. 30, 1999, now abandoned.

BACKGROUND OF THE INVENTION

1. Field of the Invention

The present invention relates to a cooking surface for cooking food having a glass ceramic surface with a glass coating thereon.

2. Background Information

Conventional glass-ceramics contain high-quartz and/or keatite mixed crystals as the main crystal phase; these are responsible for the low coefficient of thermal expansion. Depending on the crystal phase and size, these glass-ceramics can be transparent, translucent or opaque. Coloring via pigments is carried out depending on the desired application, for example increasing the hiding power or in order to achieve certain color impressions. However, the desired color impression can also be achieved by using coloring oxides, which dissolve in the glass and thus produce a colored glaze. The principal area of application of such glass-ceramics of low thermal expansion is in thermal shock-resistant laboratory equipment, cooking utensils, fire-protection glasses, chimney inspection windows and especially also treatable plates, for example cooking surfaces. Decorative coating compositions are generally categorized under "glazes" or "enamels". The glazes generally comprise a clear or colored glass (glass flux), while enamels are coating compositions containing coloring, non-transparent materials, such as pigments. The pigments used can be colored, inorganic compounds. In this application, the pigments must usually only permit slight attack by the glass flux, or none at all. Glazes and enamels are also used for coating and finishing of glass-ceramics. Large-area coatings frequently serve the purpose of protection, for example against chemical or physical attack, covering or in order to achieve a desired appearance. Decorations are used for inscriptions, for achieving a desired design or also in order to support certain technical functions, for example in the case of display windows or for marking cooking zones. The glaze or enamel is fired at temperatures below the softening point of the article to be coated, during which the respective glass composition of the glaze or enamel melts and forms a stable bond to the surface of the article. The firing temperatures are generally below the softening point of the article to be coated in order that uncontrolled deformation cannot occur. The firing also serves to volatize organic auxiliaries used, for example, as suspension medium for application of the glaze or enamel. During coating of glass-ceramics or glasses having a coefficient of thermal expansion in the region of about $4 \times 10^{-6}/K$ or greater, it is possible to find glazes or enamels having a matched coefficient of thermal expansion. According to the known art, the aim is for the decorative coatings to have a slightly lower coefficient of thermal expansion than the article to be coated. This is intended to ensure that the glaze or enamel is subjected to compressive stress during cooling after firing and thus does not exert any negative, in particular strength-reducing action on the properties of the substrate. If the coefficient of thermal expansion is not matched, stresses form between the decorative coating and substrate during cooling, which can result in crazing or cracking, possibly down into the substrate material. The mismatch means that the stresses caused impair the adhesion. A greater mismatch can result in the decorative coatings flaking off the substrate immediately or in impair the adhesion. A greater mismatch can result in the decorative coatings flaking off tile substrate immediately or in the course of time during use.

Problems have hitherto arisen in glaze or enamel decoration of glass-ceramics of low thermal expansion based on high-quartz or keatite mixed crystals produced by thermal treatment, known as ceramicization, of a suitable starting glass. Such glass-ceramics are distinguished by a coefficient of thermal expansion of less than $2 \times 10^{-6}/K$ (per degree Kelvin) in the temperature range between 20 and 700° C. (i.e., between 20 degrees Celsius and 700 degrees Celsius). Taking into account the softening point and the thermal stability of these glass-ceramics, the decoration is usually carried out at temperatures below 1200° C. In the case of glass-ceramics, the firing of the glaze or enamel is preferably carried out during the ceramicization process, i.e. the decorative coatings are applied to the green glass and fired during ceramicization (primary firing). In the case of a second decoration or for technical reasons associated. with production, for example in the case of small batch sizes, it may be desirable for the firing of the decorations to take place in a second heat treatment (secondary firing) on the pre-ceramicized glass-ceramic after the ceramicization. It would be economically advantageous if the desired properties could be established with an enamel, glaze or decorative composition both in primary and in secondary firing. For such glass-ceramics having a low coefficient of thermal expansion, decorative coatings with a matched coefficient of thermal expansion which are economical to produce have not hitherto been available. Attempts have been made in various ways to solve this problem of mismatch in order to avoid the occurrence of serious disadvantages in the desired properties.

In particular in the case of full-area coatings or dense decorations, a reduction in the tensile strength in bending occurs as a severe disadvantage The reduction in the tensile strength in bending is due first to the unavoidable formation of stresses between the decoration and the substrate as a result of the mismatch and second to the fact that adhesion of the decoration to the substrate requires a certain dissolution of the substrate by the decoration and formation of a reaction layer. It is possible to overcome this problem of reduction in the tensile strength in bending through a very sparse decoration, but this excludes full-area coatings in order to achieve protection or relatively dense decorations as a design feature. For adequate tensile strength in bending during handling, installation and later use of the decorated glass-ceramics, a mean tensile strength in bending of greater than 30 MPa is regarded as necessary.

Application of decorative coatings having a low layer thickness, for example, allows the resultant stresses to he reduced even in the case of mismatches in the coefficients of thermal expansion. However, this also means that the color effect (hiding power, color impression) and the protective action may be considerably restricted.

Compared with dense or full-area decoration, the abrasion susceptibility of sparse decorations is problematic, since sparse decoration areas are stressed to a relatively greater extent in the case of loads than are dense versions. This thus greatly restricts design freedom, for example in the case of discreet decorations with thin lines and dots.

The glazes and enamels used hitherto for coating and/or decoration of glass-ceramics having a low coefficient of thermal expansion frequently contain lead and sometimes also cadmium. Besides its favorable action in reducing the firing temperature, the use of lead and cadmium also allows decorative coatings with good adhesion to be achieved, although the coefficient of thermal expansion is in the order of from $5\times10^{-6}$/K up to as much as $10\times10^{-6}$/K. The reason why these mismatches between the decorative coatings and glass-ceramic substrates can be tolerated. without damage is ascribed to the plasticity of lead-containing fluxes. In addition, lead and cadmium additives are favorable for the strength of decorated glass-ceramics and give the glass fluxes and enamels comparatively good chemical resistance to weak acids and bases, as used in the household and also in industry as cleaners or which occur in foods.

In spite of these favorable properties of lead-containing coatings, glazes and enamels are nowadays no longer allowed to contain lead and cadmium owing to the unfavorable toxicological properties of these elements. For this reason, various ways of coating glass-ceramics of low thermal expansion without using lead or cadmium compounds have already been proposed in the literature.

DE 42 41 411 A1 attempts to solve the problem of mismatch between glass-ceramic substrate and decorative layer by adding chemically inert, optically inactive, elastic inorganic substances. Such additives consist, for example, of mica flakes, which give the decorative coating a certain plasticity. These additives allow strongly adherent, low-abrasion decorative coatings to be achieved. Disadvantages are the more complex production of the decorative coatings and a. not always desired effect on the hue and reflection of the coatings.

DE 42 01 286 C2 discloses the use of lead-free and cadmium-free glass compositions for glazing and enamelling glasses and glass-ceramics having a coefficient of thermal expansion of less than $5.0\times10^{-6}$/K. The compositions proposed comprise $Li_2O$ 0–12% by weight, MgO 0–10% by weight, CaO 3–18% by weight, $B_2O_3$ 5–25% by weight, $Al_2O_3$ 3–18% by weight $Na_2O$ 3–18% by weight $K_2O$ 3–18% by weight, BaO 0–12% by weight., $SiO_2$ 25–55% by weight, $TiO_2$ 0–5% by weight and $ZrO_2$ 0 to less than 3% by weight. The relatively high contents of alkali metals and alkaline earth metals, here in particular $K_2$ and CaO, allow decorative coatings with good adhesion to be achieved. The high alkali metal and alkaline earth metal contents are disadvantageous for the chemical resistance to acids and with respect to the strength of the decorated glass-ceramics. The relatively high coefficients of thermal expansion described are between 10.18 and $13.13\times10^{-6}$/K and are likewise caused by the high alkali metal contents.

U.S. Pat. No. 5,326,728 claims a lead-free frit containing $SiO_2$ 35–50% by weight, $B_2O_3$ 23–30% by weight, $Al_2O_3$ 10–22% by weight, $Li_2O$ 1–3% by weight, $Na_2O$ 0–3% by weight, $K_2O$ 2–5% by weight, CaO 1–5% by weight, $TiO_2$ 0–2% by weight and $ZrO_2$ 0–5% by weight where the sum $Li_2O+Na_2O+K_2O$ is less than 8% by weight and the sum $CaO+MgO+ZnO+BaO+SrO$ is less than 7% by weight. These compositions also need $K_2O$ and CaO additives in order to achieve adequate adhesive strengths in spite of the mismatch. For high demands on the acid resistance and the strength of the decorated glass-ceramics, however, these compositions are frequently inadequate. In particular the presence of $K_2O$ in amounts of greater than 2% by weight has proven extremely harmful for the tensile strength in bending of decorated glass-ceramics. The potassium ion is very mobile during firing of the decoration and accumulates in the vicinity of the reaction layer between the glass-ceramic and the decoration. This causes additional stresses, which significantly reduce the tensile strength in bending. Although the presence of $K_2O$ in contents of 2% by weight or more allows use in the form of sparse decoration designs, full-area coatings for protection or dense decorations for achieving desired aesthetic design features can, however, only be achieved to a restricted extent. The restriction in the glass former $SiO_2$ to a maximum of 50% by weight in the glaze likewise does not help to achieve high chemical resistance and high strength of the decorated article. The relatively high content of $Al_2O_3$ results in a high melting point.

The glazes of EP 0 771 765 A1 comprise 30–94% by weight of glass frit, 5–69% by weight of $TiO_2$ powder and 0.05–34% by weight of pigment. The BaO contents of 1–10% by weight are toxicologically undesired. The added, $TiO_2$ powder must satisfy special conditions, in particular grinding fineness, and means an additional complexity for the glaze production process as a whole, which is to be avoided. Owing to the color effect of $TiO_2$—as a white pigment—the use of $TiO_2$ means a restriction in the potential color design, in particular in dark colors.

Besides 40–98% by weight of glass frit and 1–55% by weight of pigments, the glazes of EP 0 776 867 A1 optionally contain an additional filler in an amount of up to 54% by weight, which JP 7-61837 A requires to be present in an amount of 0.1–20% by weight. This filler essentially consists of high-melting $ZrO_2$ and/or $ZrSiO_4$, which, besides an additional processing complexity during glaze production, prevents rapid and uniform melting of the glaze. The coloration associated with the use of $ZrO_2$ and/or $ZrSiO_4$ is frequently undesired. In contrast to the use of high-melting fillers, a relatively high. $Na_2O$ content of 5.1–15% by weight is used in the glass frit of EP 0 776 867 A1, which is detrimental to the chemical resistance of the glaze.

JP 9-30834 A describes decorations comprising up to 20% by weight of fillers in addition to 55–95% by weight of glass frit and 1–45% by weight of pigment. The glass frit comprises 5–35% by weight of $Bi_2O_3$, which results in an expensive glaze, since the raw materials for $Bi_2O_3$ are very expensive.

EP 0 509 792 A2 likewise relates to a glaze from the alkali metal/alkaline earth metal/boron/aluminum/$SiO_2$ system. The use relates to the coating of ceramic bodies, where the thermal expansion of the glazes is likewise matched to the ceramic substrate. Furthermore, the compositions mentioned require firing temperatures of 950–1250° C. Accordingly, the compositions have high viscosity.

DE 195 12 847 C1 has the object of providing compositions for use in glazes and enamels which, through matching of the thermal expansion to the glass substrate, allow thick layers with a good color effect to be achieved. From the thermal expansion point of view, the glasses are matched to soda-lime glass having a coefficient of thermal expansion of $8-9\times10^{-6}$/K. All the working points $V_A$ in the working examples are below 730° C., since the firing temperatures, owing to deformation of the glass substrate, should be below 700° C. However, experience shows that there is a general conflict between the aims of low firing temperature and chemical resistance of the glazes. Glass compositions having such a necessarily low firing temperature cannot achieve a good chemical resistance which is necessary for glass-ceramic coating.

In the publications cited, a glass frit is first produced by grinding the molten glass.

By grinding, for example in ball mills, a glass Fritz having a mean particle diameter of less than 10 $\mu$m, preferably less than 5 μm, or around 4–5 μm or even 1–3 μm (DE 42 01 268 C2) is produced. The glass frit is, if desired, mixed with commercially available pigments, fillers and additives and converted into a material having a certain consistency necessary for the selected coating or application process.

In the cited publications, direct screen printing is selected as one of a number of processes.

Screen-printable pastes are produced using suspending media and solvents, for example ethylcellulose, and screen-printing media, for example based on fir oil. The paste consistency set determines, inter alia, the layer thickness of the decoration after firing.

In the cited publications, the range between the minimum and maximum thickness of the layer is from 0.2 to 20 μm (EP 0 776 867 A1).

OBJECT OF THE INVENTION

An object of the invention is therefore to provide lead-free and cadmium-free glass compositions for the glazing, enamelling and decoration of glasses or glass-ceramics which, after crystallization, have a low coefficient of thermal expansion of less than about $2 \times 10^{-6}$/K at between 20 and 700° C. which meet all requirements. In particular, the glass compositions should be readily processable in a low and relatively broad temperature range and in addition give glazes or enamels which exhibit very good properties for use in the industrial and domestic sectors with respect to adhesive strength, chemical resistance to acids and ryes, gloss and staining sensitivity. A further object of the invention is that the glass-ceramics decorated with the glass compositions have lowsusceptibility to abrasion, both in dense and in sparse decoration versions, so offering design freedom. Furthermore, the glass-ceramics decorated with the glass compositions should have high strength. Firing onto glasses and glass-ceramics containing high-quartz and/or cutout mixed crystals as the main crystal phase and having a low coefficient of thermal expansion of less than $2 \times 10^{-6}$/K should be carried out either by the ceramicization process (primary firing) or onto pre-converted substrate material (secondary firing).

SUMMARY OF THE INVENTION

This object is achieved by the glass composition described as follows, namely, lead-free and cadmium-free glass for glazing, enamelling and decorating glasses or glass-ceramics which. after crystallization, have a low coefficient of thermal expansion of less than about $2 \times 10^{-6}$/K at between about 20 and about 700° C., characterized by a composition (in % by weight) of:

| | | | |
|---|---|---|---|
| $Li_2O$ | 0 | — | 6 |
| $Na_2O$ | 0 | — | 5 |
| $K_2O$ | 0 | — | less than 2 |
| $\Sigma Li_2O + Na_2O + K_2O$ | 2 | — | 12 |
| MgO | 0 | — | 4 |
| CaO | 0 | — | 4 |
| SrO | 0 | — | 4 |
| BaO | 0 | — | 1 |
| ZnO | 0 | — | 4 |
| $Al_2O_3$ | 3 | — | less than 10 |
| $B_2O_3$ | 13 | — | 23 |
| $SiO_2$ | 50 | — | 65 |
| $TiO_2$ | 0 | — | 4 |
| $ZrO_2$ | 0 | — | 4 |
| F | 0 | — | 4 | as replacement for oxygen and containing up to about 30% by weight of a pigment which is resistant at the firing temperature where the glass is suitable for glazing, enamelling, and decoration in both primary and secondary firing, and both the full-area and sparse glaze, enamel or decoration layers have low abrasion susceptibility after firing.

It has been found that the glass composition according to the invention essentially achieves the properties of PbO- and CdO-containing glass compositions with respect to adhesive strength, chemical resistance, strength and low abrasion stability. In the case of glass-ceramics decorated over the entire area, the tensile strength in bending after firing achieves values greater than 30 MPa. In addition, advantages can even arise regarding lower straining sensitivity with respect to contamination. In the glass compositions according to the invention, viscosity-lowering components, such as alkali metals, $B_2O_3$ and, if desired, alkaline earth metals, ZnO and F, are combined in relatively narrow limits with oxides which are involved in building up the glass network, in particular $SiO_2$, $Al_2O_3$ if desired with small proportions of $TiO_2$, $ZrO_2$, $La_2O_3$, $SnO_2$, $Sb_2O_3$, $Bi_2O_3$ or $P_2O_5$.

The sum of the alkali metals $Li_2O$, $Na_2O$ and $K_2O$ should preferably be between about 2 and about 12% by weight. The addition of alkali metals is necessary in order to achieve the low firing temperatures desired. In addition to their viscosity-lowering action, the alkali metals are also responsible to a large extent for the gloss of the decorative layer applied. Higher alkali metal contents can impair the acid resistance of the applied layers. Higher alkali metal contents can also have an adverse effect on the strength of the coated glass-ceramics. The thermal expansion of the glass is significantly increased. The $Li_2O$ content is limited to about 6% by weight and the $Na_2O$ content to about 5% by weight. The $K_2O$ content must be below about 2% by weight. $K_2O$ is favorable for the adhesive strength of the applied decorative layers, but is less effective in lowering the viscosity. Higher $K_2O$ contents have a highly adverse effect on the strength of the decorated glass-ceramics. Preference is given to an $Li_2O$ content of from about 1 to about 5.8% by weight and a total alkali metal content of from about 2 to about 10% by weight.

The $B_2O_3$ content is between about 13 and about 23% by weight. $B_2O_3$ additives are necessary in order to stabilize the glass melt against undesired devitrification. $B_2O_3$ lowers the viscosity of the glass and enables firing at low temperatures. $B_2O_3$ furthermore has a positive effect on gloss. At higher $B_2O_3$ contents than 23% by weight, the acid resistance of the coating is impaired. Lower contents than 13% by weight result in inadequate viscosity behavior and reduced abrasion resistance. Particularly favorable properties are possessed by glass compositions having a $B_2O_3$ content of from 14 to 23% by weight.

$SiO_2$ and to a lesser extent $Al_2O_3$ are principal constituents of the glass according to the invention. $SiO_2$ is, as network former, responsible for the stability, chemical resistance and strength. The $SiO_2$ content is preferably between about 50 and about 65% by weight. Higher $SiO_2$ contents are unfavorable owing to their viscosity-increasing action, because of which they can prevent smooth flow of the coating during firing and increase the melting point. Below 50% $SiO_2$ by weight, the acid resistance of the glass composition can be too low. Preference is given to an $SiO_2$ content of between about 51 and about 65% by weight. $SiO_2$ has a favorable effect on the strength of the decorated glass-ceramics. The $Al_2O_3$ content is between about 3 and less than about 10% by weight, preferably between about 5 and less than about 10% by weight. $Al_2O_3$ promotes the stability of the glass and the strength of the decorated glass-ceramics. Lower contents than 3% by weight can mean inadequate strength values. High contents of $Al_2O_3$ can impair the gloss, in particular contents above about 10% by weight increase the viscosity of the glass significantly, which has an adverse effect in particular during secondary firing. For rapid melting of the glass layer and adequate formation of the reaction layer between the glaze and the substrate material, a relatively low viscosity of the glass is necessary during the secondary firing process. Surprisingly, it is found that $Al_2O_3$ contents of less than about 10% by weight can result in low abrasion susceptibility, even in the case of sparse decoration. Particularly favorable properties are possessed by glass compositions having an $Al_2O_3$ content of from about 5 to less than about 10% by weight.

Additions of alkaline earth metals support the viscosity-lowering action of the alkali metals. Glossy and adhesion are even improved. Permissible additions are a maximum of about 4% by weight of each of MgO, CaO and SrO, and, for toxicological reasons, a maximum of about 1% by weight of BaO. If the upper limits stated are exceeded, the acid resistance and strength are impermissably impaired. The sum of the alkaline earth metals is preferably from about 1 to about 9% by weight.

In order to improve the viscosity behavior and abrasion, the glass composition can contain a maximum of 4% by weight of ZnO However, an excessive ZnO content results in an impairment in the strength.

In order to improve the acid resistance, the glass may furthermore contain $TiO_2$ in amounts of between 0 and about 4% by weight, preferably between 0 and about 3% by weight. Higher $TiO_2$ contents can endanger the stability of the glass. $ZrO_2$ may be present in the glass in amounts of up to 4% by weight, preferably up to 3% by weight. The addition of $ZrO_2$ promotes the chemical resistance to ryes, or bases, and the strength of the decorated glass-ceramics. Higher contents impair the abrasion and endanger the stability of the glass to devitrification.

The glass may furthermore contain added fluorine in amounts of up to about 4% by weight, preferably up to about 3% by weight. The addition of F lowers the viscosity and thus the firing temperature. Fluorine ions replace a corresponding amount of oxygen anions in the glass structure. However, higher contents can impair the acid resistance of the glass. Further additives which may be present in the glass are $Bi_2O_3$, $La_2O_3$ $SnO_2$, $Sb_2O_3$ and $P_2O_5$. The maximum amount of the individual oxides preferably should not exceed about 3% by weight. If more than. one of these oxides are used together, the sum of the contents of these oxides should, however, preferably not exceed about 5% by weight. The addition of $SnO_2$ improves the chemical resistance, but results in an increase in viscosity. $La_2O_3$, $Bi_2O_3$ and $P_2O_5$ improve the meltability, but higher contents can endanger the devitrification stability and the chemical resistance. Addition of $Sb_2O_3$ in amounts of up to about 3% by weight is permissible and promotes the adhesion of the decorative coatings. Higher contents are toxicologically undesired and can impair the acid resistance. The object of the invention is achieved particularly well by a glass composition containing (in % by weight), between about 3 and about 5.5 of $Li_2O$, between 0 and about 4.5 of $Na_2O$, and between 0 and less than about 2 of $K_2O$ (sum of the alkali metals $Li_2O$, $Na_2O$ and $K_2O$ between 3 and 10), between 0 and about 2.5 of MgO, between about 0.5 and about 3.5 of CaO, between about 0.5 and about 3.5 of SrO, between about 1.5 and about 4 of ZnO, between about 18 and about 23 of $B_2O_3$ between about 5 and less than about 10 of $Al_2O_3$ between about 53 and about 62 of $SiO_2$, between about 0.5 and about 2.5 of $ZrO_2$ and between 0 and about 2.5 of F as replacement for O.

Glass powders comprising glasses of the composition according to the invention can readily be mixed with pigments in an amount of up to 30% by weight of pigment and then used for the production of colored coatings, enamels and/or decorations. The pigments used are conventional inorganic materials which are essentially resistant to the glass composition at firing temperatures. However, specific addition of coloring oxides which dissolve in the glass also allows the glaze to be mass-colored.

The glasses according to the invention are first melted homogeneously, and a glass powder Having a mean particle size of less than about 10 μm, preferably less than about 5 μm, is then produced from the resultant glass by grinding. Starting from the resultant glass powder, the glass-ceramics to be decorated are then coated, if desired after addition of appropriate pigments. The coating is carried out using generally known industrial processes, such as, for example, dipping, spraying, screen printing, etc. Processing is carried out with addition of conventional organic auxiliaries and/or suitable suspending media. In the case of screen-printing, for example, the powder is mixed with a screen printing oil, the paste is homogenized in a three-roll mill and then applied by direct screen printing or by the decal method (indirect screen printing). Alternatively, mixing with thermoplastic auxiliaries allows screen printing with exposure to heat. Firing on the glass-ceramic to be decorated gives layers whose thickness is usually between about 1 and about 9 μm. The glass-ceramics to be coated are preferably either in the glassy initial state or in the ceramicized final state. Firing of the glaze or enamel layers is either carried out during the ceramicization process (primary firing) or on the pre-converted substrate material (secondary firing). The compositions of the glass-ceramics to be coated and the ceramicization process acre described in the literature, for example in EP 220 333 B1. The ceramicization is preferably carried out in the temperature range of about 800–950° C. or about 900–1200° C., depending on whether the main crystal phase is to comprise high-quartz or keatite mixed crystals. In order to achieve an adequate crystal density, the ceramicization is usually preceded by nucleation. at temperatures between 650 and 800° C. Particularly favorable properties of the coated glass-ceramics produced from the glasses according to the invention are achieved if glasses whose transition, softening and working temperatures are significantly higher than conform to the known art are selected from the stated composition range. Thus, the transition temperatures ($T_g$) are preferably about 400–650° C., in particular from about 425–590° C., the softening points ($E_w$) are about 580–830° C., in particular about 600–780° C., and the working points ($V_A$) are about 840–1100° C., in particular about 850–1050° C. The coefficients of thermal expansion α at between about 20 to about 300° C. are from about 3.5 to about $8 \times 10^{-6}$/K, particularly from about 4.0 to about $7.5 \times 10^{-6}$/K. The relatively high temperatures for $T_g$, $E_w$ and $V_A$ have a favorable effect on the thermal stability of the decorative coatings. Thus, virtually no color change is visually perceptible even after 75 hours at 670° C.

The glasses according to the invention can be used to produce on glass-ceramic substrates decorative coatings which correspond to the known PbO- and CdO-containing glasses in respect of gloss and abrasion resistance. With respect to thermal stability and staining sensitivity, the glasses according to the invention can even be superior to PbO- and CdO-containing glasses. A particular advantage of the glasses according to the invention consists in their excellent adhesion, in spite of the very great differences in thermal expansion between the decorative coating and glass-ceramic substrates, and good chemical resistance and in the high strength of the glass-ceramics coated therewith. Even at relatively large layer thicknesses of the decorative coatings, for example of top to about 9 μm, essentially no detachment from the glass-ceramic is evident, even in the case of temperature shock, large differences in the thermal expansion between the decorative coating and the glass-ceramic being tolerated. This good adhesion is retained over extended periods in practice use, together with extreme temperature shocks. Chemical stability and, here, especially the resistance to acids is advantageous over known lead-free compositions. The strength of the glass-ceramics coated with the glasses according to the invention is significantly improved over known lead-free compositions, especially in the case of dense decoration designs. Glass-ceramic products decorated over the entire area have tensile strength in bending of greater than about 30 MPa after firing.

A particular advantage of the glasses according to the invention is that the firing for glazing, enamelling and decorating substrates comprising glass-ceramics can be carried out either together with the ceramicization process (primary firing) or on substrates which have already been converted into glass-ceramic with a low expansion behavior (secondary firing).

Secondary firing on substrates which have already been converted into glass-ceramic its usually carried out at process temperatures of from about 800° C. to about 1200° C., usually between about 800° C. and about 950° C. in the case of glass-ceramics with high-quartz mixed crystals as the main crystal phase.

By means of the composition according to the invention, the softening behavior of the decorative glass or enamel is adjusted so that smooth melting on the one hand and on the other hand adequate stability in order to produce the contour sharpness of the applied design are ensured at the respective process temperatures.

A further advantage of the glasses according to the invention is the low abrasion susceptibility of these decorations, not only in full area-decorations, but also in sparse decorations, such as, for example, dots and irregular structures, which enables the design freedom to be increased.

The above-discussed embodiments of the present invention will be described further hereinbelow with reference to examples. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

DESCRIPTION OF THE PREFERRED EMBODIMENT

The present invention is illustrated in greater detail rith the aid of the examples below:

Table 1 contains 9 different glass compositions by % by weight and the associated measurement parameters which characterize the viscosity, such as transition temperature ($T_g$ in ° C., softening point ($E_w$ in ° C.), working point ($V_A$ in ° C.) and the coefficient of thermal expansion α at between 200 and 300° C. in $10^{-6}$/K. Glass compositions 8 and 9 are outside the composition range according to the invention and are included for comparative purposes.

The glasses of compositions 1 to 9 are ground to give powders having a mean particle size of from 0.8 to 3 μm. The resultant powder is mixed with commercially available pigments for white) green, blue, brown and black from Cookson-Matthey or a white pigment from Bayer (white$_B$) as shown in. Table 2 (Examples 1–12 primary firing and 13–25 secondary firing) and converted into a screen-printing paste with addition of fir oil-based screen-printing oil. Viscosities of between 1 and 7 Pa s are measured using a Brookfield rheometer. The resultant pastes are used to print starting glasses which can be converted into glass-ceramics or pre-ceramicized substrate material (in accordance with EP 220 333 B1). The screen prints carried out include both different decorative designs and test patterns printed over the entire area. A screen with a 150 T mesh width is used. The coatings can be fired in a continuous production furnace or a laboratory furnace. In Examples 1 to 12, ceramicization of the starting glass to give a glass-ceramic also occurs.

In Example 10, the decoration firing is carried out at temperatures between 1060 and 1140° C. The substrate material in Examples 13 to 23 and 25 is converted, before decoration, into a glass-ceramic by the heat-treatment process at between 680° C. and 920° C. which is described in EP 220 333 B1. In Example 24, the conversion into glass-ceramic is carried out at between 1060° C. and 1140° C. The decoration firing in Examples 13 to 22 and 24 and 25 is carried out at a temperature of between 840° C. and 920° C. The decoration firing in Example 23 is carried out at temperatures between 1060° C. and 1140° C.

Examples 11, 12 and 25 with glass No. 8 and No. 9 are outside the claimed composition range and do not satisfy at least one of said properties.

After firing, layer thicknesses in the order of from 2.5 to 4.5 μm are measured.

The adhesive strength is determined by means of transparent adhesive tape (Tesafilm® 104, Beiersdorf): after rubbing onto the decoration layer and quick peeling off, it is assessed whether and to what extent decoration particles adhere to the adhesive film. The test is regarded as passed if no or very few particles adhere to the adhesive film (=OK).

The flexural strength is determined by the double-ring method of DIN 52300, Part 5, on samples measuring 100× 100 mm which have been block-coated in the center in a 50×50 mm area. The mean of the strengths of at least 12 samples is given.

The abrasion susceptibility is tested as follows on a decorated substrate:

Besides full-area decoration, sparse test screens with 1 mm diameter dots and irregular structures of various shapes with a maximum width of 1 mm are produced and tested.

The sample is rubbed with a rotating movement with commercially available sandpaper at a pressure of 1.3 kg. After 1400 rotations, the changes in the decoration are classified in 4 grades "very good", "good", "not good" and "poor", where the test with "not good" is also regarded as a fail.

The measured values show that the compositions according to the invention have both good adhesive strengths and good acid resistance and comparatively high flexural strength (greater than 30 MPa). Furthermore, the glasses according to the invention are highly suitable for firing onto glasses and glass-ceramics which contain high-quartz and/or keatite mixed crystals as tile main phase and have a low coefficient of thermal expansion of less than $2\times10^{-6}$/K, both with the ceramicization process (primary firing) and onto the pre-converted substrate material (secondary firing). The glaze, enamel and decoration layers fired in this way are distinguished by low abrasion susceptibility even in the case of sparse decoration designs. This combination is not achieved with the comparative compositions. Said properties approach those of PbO- and CdO-containing glazes and enamels. In addition, however, the compositions have a significantly improved staining sensitivity and thermal resistance compared therewith. Gloss, resistance to basic cleaning agents and cleaning behavior by conventional and known standard methods also show that the glass compositions according to the invention are highly suitable for replacing PbO- and CdO-containing glasses.

TABLE 1

Glass composition (in % by weight) and properties

| | Glass No. | | | | | | | | |
|---|---|---|---|---|---|---|---|---|---|
| | 1 | 2 | 3 | 4 | 5 | 6 | 7 | 8 | 9 |
| $Li_2O$ | 2 | 3 | 4.4 | 2 | 2 | 3.3 | 4.6 | 1 | 1.1 |
| $Na_2O$ | 4 | 2 | — | 4 | 4 | 4 | 4.1 | 4 | 9.2 |
| $K_2O$ | 1 | 1 | — | — | 1.3 | — | — | — | 0.4 |
| MgO | 2 | — | 1.2 | 1 | — | 1 | 0.9 | — | — |
| CaO | — | — | 2 | — | 3 | 0.7 | 1.3 | — | — |
| SrO | 3 | — | 2 | 1 | — | 1.4 | 1.8 | — | — |
| BaO | — | 1 | 1 | — | — | — | — | — | 2.6 |
| ZnO | 3 | 1 | 3 | 2 | — | 1.1 | 0.2 | — | — |
| $B_2O_3$ | 22 | 17 | 17.6 | 20 | 22 | 19.9 | 17.5 | 21 | 19.1 |
| $Al_2O_3$ | 6 | 8.8 | 9 | 6.4 | 9.8 | 6 | 6 | 16 | 5 |
| $Bi_2O_3$ | — | — | 2 | — | 1.4 | — | — | — | — |
| $La_2O_3$ | — | 1 | — | — | 2.6 | — | — | — | — |
| $SiO_2$ | 55 | 61.4 | 54 | 61 | 52 | 60.5 | 60.3 | 54 | 62.4 |
| $TiO_2$ | — | 2 | — | — | — | — | — | 1 | — |
| $ZrO_2$ | 2 | — | 1 | — | — | 1 | 2.1 | 1 | — |
| $SnO_2$ | — | — | — | 1 | 1.5 | — | — | — | — |
| $P_2O_5$ | — | — | — | 1 | — | — | — | — | — |
| $Sb_2O_3$ | — | 1.8 | 0.8 | — | 0.4 | — | — | — | — |
| F | — | — | 2 | 0.6 | — | 1.1 | 1.2 | 2 | 0.2 |
| $T_g$ (° C.) | 510 | 490 | 485 | 485 | 525 | 475 | 475 | 480 | 520 |
| $E_W$ (° C.) | 670 | 675 | 685 | 695 | 675 | 660 | 630 | 745 | 670 |
| $V_A$ (° C.) | 925 | 985 | 885 | 987 | 930 | 900 | 873 | 1144 | 933 |
| $\alpha_{20-330}$ ° C. ($10^{-6}$/K) | 5.5 | 5.0 | 5.3 | 5.0 | 5.8 | 5.5 | 6.2 | 4.5 | 6.5 |

TABLE 2

Production and properties (primary firing)

| | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| | Glass No. | | | | | | | | | | | |
| | 1 | 2 | 3 | 4 | 5 | 6 | 7 | 7 | 7 | 7 | 8 | 9 |
| Pigment | 20% by wt. white$_B$ | 20% by. wt. white$_{CM}$ | 20% by wt. white$_{CM}$ | 20% by wt. white$_{CM}$ | 20% by wt. white$_{CM}$ | 20% by wt. white$_B$ | 20% by wt. white$_{CM}$ | 20% by wt. green | 20% by wt. brown | 20% by wt. black | 20% by wt. white$_B$ | 20% by wt. white$_B$ |
| Substrate | Glass | Glass | Glass | Glass | Glass | Glass | Glass | Glass | Glass | Glass | Glass | Glass |
| Adhesion | OK | OK | OK | OK | OK | OK | OK | OK | OK | OK | OK | OK |
| Flex. strength (MPa) | 35 | 47 | 44 | 41 | 39 | 39 | 45 | 42 | 40 | 78 | 45 | 39 |
| Abrasion (structure) | very good | very good | very good | very good | very good | good | good | good | good | good | not good | not good |

TABLE 2-continued

Production and properties (secondary firing)

| | Example | | | | | | | | | | | | |
|---|---|---|---|---|---|---|---|---|---|---|---|---|
| | 13 | 14 | 15 | 16 | 17 | 18 | 19 | 20 | 21 | 22 | 23 | 24 | 25 |
| Glass No. | 1 | 2 | 3 | 4 | 5 | 6 | 7 | 7 | 7 | 7 | 7 | 7 | 8 |
| Pigment | 20% by wt. white$_B$ | 20% by wt. white$_{CN}$ | 20% by wt. white$_{CM}$ | 20% by wt. white$_{CM}$ | 20% by wt. white$_{CM}$ | 20% by wt. white$_{CM}$ | 20% by wt. white$_{CM}$ | 20% by wt. blue | 20% by wt. green | 20% by wt. brown | 20% by wt. black | 20% by wt. black | 20% by wt. white$_B$ |
| Substrate | Glass-ceramic | Glass-ceramic | Glass-ceramic | Glass-ceramic | Glass-ceramic | Glass-ceramic | Glass-ceramic | Glass-ceramic | Glass-ceramic | Glass-ceramic | Glass-ceramic | Glass-ceramic | Glass-ceramic |
| Adhesion | OK | OK | OK | OK | OK | OK | OK | OK | OK | OK | OK | OK | OK |
| Flex. strength (MPa) | 42 | 48 | 43 | 43 | 40 | 69 | 62 | 52 | 64 | 73 | 72 | 96 | 59 |
| Abrasion (structure) | very good | very good | very good | very good | very good | good | very good | very good | very good | very good | very good | very good | not good |

One feature of the invention resides broadly in lead- and cadmium-free glass for glazing enamelling and decorating glasses or glass-ceramics which, after crystallization, have a low coefficient of thermal expansion of less than $2\times10^{-6}$/K at between 20 and 700° C., characterized by a composition (in % by weight) of:

| | | | |
|---|---|---|---|
| Li$_2$O | 0 | — | 6 |
| Na$_2$O | 0 | — | 5 |
| K$_2$O | 0 | — | less than 2 |
| ΣLi$_2$O + Na$_2$O + K$_2$O | 2 | — | 12 |
| MgO | 0 | — | 4 |
| CaO | 0 | — | 4 |
| SrO | 0 | — | 4 |
| BaO | 0 | — | 1 |
| ZnO | 0 | — | 4 |
| Al$_2$O$_3$ | 3 | — | less than 10 |
| B$_2$O$_3$ | 13 | — | 23 |
| SiO$_2$ | 50 | — | 65 |
| TiO$_2$ | 0 | — | 4 |
| ZrO$_2$ | 0 | — | 4 |
| F | 0 | — | 4 | as replacement for oxygen and containing up to 30% by weight of a pigment which is resistant at the firing temperature where the glass is suitable for glazing, enamelling, and decoration in both primary and secondary firing, and both the full-area and sparse glaze, enamel or decoration layers have low abrasion susceptibility after firing.

Another feature of the invention resides broadly in glass characterized by a composition (in % by weight) of:

| | | | |
|---|---|---|---|
| Li$_2$O | 1 | — | 5.8 |
| Na$_2$O | 0 | — | 5 |
| K$_2$O | 0 | — | less than 2 |
| ΣLi$_2$O + Na$_2$O + K$_2$O | 2 | — | 10 |
| MgO | 0 | — | 3 |
| CaO | 0 | — | 4 |
| SrO | 0 | — | 4 |
| BaO | 0 | — | 1 |
| ZnO | 0 | — | 4 |
| Al$_2$O$_3$ | 5 | — | less than 10 |
| B$_2$O$_3$ | 14 | — | 23 |
| SiO$_2$ | 51 | — | 65 |
| TiO$_2$ | 0 | — | 3 |
| ZrO$_2$ | 0 | — | 3 |
| F | 0 | — | 3 | as replacement for oxygen and containing up to 30% by weight of a pigment which is resistant at the firing temperature.

Yet another feature of the invention resides broadly in glass characterized. by a composition (in % by weight) of:

| | | | |
|---|---|---|---|
| Li$_2$O | 3 | — | 5.5 |
| Na$_2$O | 0 | — | 4.5 |
| K$_2$O | 0 | — | less than 2 |
| ΣLi$_2$O + Na$_2$O + K$_2$O | 3 | — | 10 |
| MgO | 0 | — | 2.5 |
| CaO | 0.5 | — | 3.5 |
| SrO | 0.5 | — | 3.5 |
| ZnO | 1.5 | — | 4 |
| Al$_2$O$_3$ | 5 | — | less than 10 |
| B$_2$O$_3$ | 18 | — | 23 |
| SiO$_2$ | 53 | — | 62 |
| TiO$_2$ | 0 | — | 3 |
| ZrO$_2$ | 0.5 | — | 2.5 |
| F | 0 | — | 2.5 | as replacement for oxygen and containing up to 30% by weight of a pigment which is resistant to the firing temperature.

A further feature of the invention resides broadly in glass characterized by a content of up to 3% by weight of one or more of the oxides Sb$_2$O$_3$, SnO$_2$, La$_2$O$_3$, Bi$_2$O$_3$ and P$_2$O$_5$ where the sum of the oxides is less than 5% by weight.

Still a further feature of the invention resides broadly in glass characterized by ΣMgO+CaO+SrO+BaO=1–9% by weight.

Yet another feature of the invention resides broadly in glass characterized in that it is used for glazing, enamelling, decorating glasses or glass-ceramics which contain, after crystallization, high-quartz and/or keatite mixed crystals as the main crystal phase and have a low coefficient of thermal expansion of less than $2\times10^{-6}$/K at between 20 and 700° C.

Another feature of the invention resides broadly in glass characterized by a coefficient of thermal expansion $\alpha_{20/300°\ C.}$ of from 3.5 to $8\times10^{-6}$/K, in particular from 4.0 to $7.5\times10^{-6}$/K, a transition temperature of 400–650° C., in particular 425–590° C., a softening point of 580–830° C., in particular 600–780° C., and a working point of 840–1100° C., in particular 850–1050° C.

A further feature of the invention resides broadly in glass characterized in that the glass has a mean particle size of less than 10 μm, in particular less than 5 μm.

Yet another feature of the invention resides broadly in glass characterized in that the layer thickness after firing is less than 9 µm, in particular 1 µm–7 µm.

Another feature of the invention resides broadly in glass characterized in that the mean tensile strength in bending of the glass-ceramic with either full-area decoration or sparse decoration is greater than 30 MPa after firing.

A further feature of the invention resides broadly in a process for the production of a glass-ceramic glazed, enamelled or decorated with a glass according to at least one of the above-cited features and characterized in that the firing of the glaze, enamel or decoration layer is carried out together wit]the ceramicization process a the glass to be glazed, enamelling and decorated to give a glass-ceramic (primary firing).

Another feature of the invention resides broadly in a process for the production of a glass-ceramic glazed, enamelled, or decorated with a glass according to at least one of the above-cited features, and characterized in that the firing of the glaze, enamel or decoration layer is carried out on the substrate which hats already been converted into glass-ceramic (secondary firing).

Examples of white pigments commercially available from Bayer might be found in U.S. Pat. No. : 4,249,953, issued on Feb. 10, 1981; U.S. Pat. No. 5,744,108 issued on Apr. 28, 1998; U.S. Pat. No. 5,250,112 issued on Oct. 5, 1993; U.S. Pat. No. 5,162,518 issued on Nov. 10, 1992; U.S. Pat. No. 5,035,748 issued on Jul. 30, 1997; U.S. Pat. No. 4,193,907 issued on Mar. 18, 1980; U.S. Pat. No. 3,971,741 issued on Jul. 27, 1976.

Examples of pigments commercially available from Cookson-Matthey might be found in U.S. Pat. Nos.: 5,795,940 issued Aug. 18, 1998; U.S. Pat. No. 5,782,945 issued Jul. 21, 1998; U.S. Pat. No. 5,779,784 issued Jul. 14, 1998; U.S. Pat. No. 5,753,027 issued May 19, 1998; U.S. Pat. No. 5,747,395 issued May 5, 1998; and U.S. Pat. No. 5,605,869 issued Feb. 25, 1997.

Examples of screen printing might he found in U.S. Pat. No. : 5,925,444, issued Jul. 20, 1999; U.S. Pat. No. 5,925,160, issued Jul. 20, 1999; U.S. Pat. No. 5,921,176, issued Jul. 13, 1999; and U.S. Pat. No. 5,916,834, issued Jun. 29, 1999.

Examples of lead-free and/or cadmium free-glass compositions might be found in U.S. Pat. No. : 5,633,090 issued May 27, 1997; U.S. Pat. No. 4,537,862 issued on Aug. 27, 1985; U.S. Pat. No. 4,446,241 issued on May 1, 1984; U.S. Pat. No. 5,843,853 issued on Dec. 1, 1998; and U.S. Pat. No. 5,707,909 issued on Jan. 13, 1998.

Examples of Tesafilm® and/or uses therefor may be found in U.S. Pat. Nos. 5,525,656; 5,070,121; 4,597,987; 4,554,339; 4,444,946; 4,161,560; and 4,161,547.

Other references which may provide information relevant to the present invention may be found in: Epples, "Glazes and Enamels" Glass, Science and Technology vol, Chapter 4, 1983 pp. 301–336; Chemical Abstracts 110,(1989) Mar.20.No.6; Chemical Abstracts 110, (1989) Mar.6.No.10.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at-least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. DE 198 34 801.0–45, filed on Aug. 1, 1998, having inventors Ina Mitra, Dr. Friedrich Siebers, Dr. Jutta Reichert, Dr. Cora Krause, Dr. Otmar Becker, and Dr. Michael Bug, and DE-OS 198 34 801.0–45 and DE-PS 198 34 801.0–45, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant option, into the claims during prosecution as further limitation in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A cooking surface for cooking food comprising:
a glass ceramic material comprising a crystallized and ceramicized glass;
a heatable plate;
cooking zones;
marking for marking said cooking zones;
said glass ceramic having a coefficient of thermal expansion over a substantial temperature range;
said marking comprising a coating;
said coating comprising a glass;
said glass coating comprising a glass configured to have a coefficient of thermal expansion substantially different from said coefficient of thermal expansion of said glass ceramic;
said glass coating being disposed on said glass ceramic surface, and said glass ceramic and said glass coating together having a mean tensile strength in bending which is maximized, and said glass coating comprising a pigment and comprising a non-toxic glass being configured to maximize adhesive strength to said glass ceramic;
said glass coating comprising a glass configured to have a melting point which is minimized and configured to have an abrasive resistance which is maximized and configured to maximize adhesive strength to said glass ceramic; and
said glass of said glass coating comprising less than 3% by weight calcium oxide, less than 5% by weight lithium oxide, and less than 1.5% by weight potassium oxide.

2. The cooking surface according to claim 1, wherein:

said glass coating is free of lead and cadmium;

said glass coating comprises one of: a glaze, an enamel, and a decoration;

said glass ceramic material has a coefficient of thermal expansion of less than $2 \times 10^{-6}/K$ at a temperature between 20° C. and 700° C.;

said glass coating further comprises (in % by weight):

| | |
|---|---|
| $Na_2O$ | 0 to 5 |
| $\Sigma Li_2O + Na_2O + K_2O$ | 2 to 12 |
| MgO | 0 to 4 |
| SrO | 0 to 4 |
| BaO | 0 to 1 |
| ZnO | 0 to 4 |
| $Al_2O_3$ | 3 to less than 10 |
| $B_2O_3$ | 13 to 23 |
| $SiO_2$ | 50 to 65 |
| $TiO_2$ | 0 to 4 |
| $ZrO_2$ | 0 to 4 |
| F | 0 to 4 | as replacement for oxygen; and up to 30% by weight of a firing-temperature-resistant pigment.

3. The cooking surface according to claim 2, wherein said glass comprises (in % by weight):

| | |
|---|---|
| $LiO_2$ | 1 to less than 5 |
| $Na_2O$ | 0 to 5 |
| $\Sigma Li_2O + Na_2O + K_2O$ | 2 to 10 |
| MgO | 0 to 3 |
| SrO | 0 to 4 |
| BaO | 0 to 1 |
| ZnO | 0 to 4 |
| $Al_2O_3$ | 5 to less than 10 |
| $B_2O_3$ | 14 to 23 |
| $SiO_2$ | 51 to 65 |
| $TiO_2$ | 0 to 3 |
| $ZrO_2$ | 0 to 3 |
| F | 0 to 3 | as replacement for oxygen; and up to 30% by weight of a firing-temperature-resistant pigment.

4. The cooking surface according to claim 3, wherein said glass comprises (in % by weight):

| | |
|---|---|
| $Li_2O$ | 3 to less than 5 |
| $Na_2O$ | 0 to 4.5 |
| $\Sigma Li_2O + Na_2O + K_2O$ | 3 to 10 |
| MgO | 0 to 2.5 |
| CaO | 0.5 to less than 3 |
| SrO | 0.5 to 3.5 |
| ZnO | 1.5 to 4 |
| $Al_2O_3$ | 5 to less than 10 |
| $B_2O_3$ | 18 to 23 |
| $SiO_2$ | 53 to 62 |
| $TiO_2$ | 0 to 3 |
| $ZrO_2$ | 0.5 to 2.5 |
| F | 0 to 2.5 | as replacement for oxygen; and up to 30% by weight of a firing-temperature-resistant pigment.

5. The cooking surface according to claim 4, wherein:

said glass coating comprises at least one of the following oxides: $Sb_2O_3$, $SnO_2$, $La_2O_3$, $Bi2O_3$ and $P_2O_5$; and said glass coating comprises up to 3% by weight of each of said $Sb_2O_3$, $SnO_2$, $La_2O_3$, $Bi_2O_3$ and $P_2O_5$ and less than 5% by weight of the sum of the percents of said $Sb_2O_3$, $SnO_2$, $La_2O_3$, $Bi_2O_3$ and $P_2O_5$.

6. The cooking surface according to claim 5, wherein the sum of MgO+CaO+SrO+BaO is 1% to 9% by weight of said glass coating.

7. The cooking surface according to claim 6, wherein:

said glass ceramic comprises, as the main crystal phase, at least one of: high-quartz crystals and keatite mixed crystals.

8. The cooking surface according to claim 7, wherein:

said glass coating has a coefficient of thermal expansion $\alpha_{20/300°\ C.}$ in the range of one of: $3.5 \times 10^{-6}/K$ to $8 \times 10^{-6}/K$ and $4.0 \times 10^{-6}/K$ to $7.5 \times 10^{-6}/K$;

said glass coating has a transition temperature in the range of one of: 400° C. to 650° C. and 425° C. to 590° C.;

said glass coating has a softening point in the range of one of: 580° C. to 830° C. and 600° C. to 780° C.; and said glass coating has a working point in the range of one of: 840° C. to 1100° C. and 850° C. to 1050° C.

9. The cooking surface according to claim 8, wherein said glass coating has a mean particle size of one of: less than 10 $\mu m$ and less than 5 $\mu m$.

10. The cooking surface according to claim 9, wherein:

said glass coating has a thickness of one of: less than 9 $\mu m$ and in the range of 1 $\mu m$ to 7 $\mu m$;

said maximized mean tensile strength in bending of said glass-coated glass ceramic is greater than 30 megapascals; and said glass-coated glass ceramic which has a mean tensile strength in bending of greater than 30 megapascals for both of: a full-area decoration and a partial-area decoration.

11. A glass ceramic object, such as a cooking surface for cooking food comprising a glass ceramic surface forming a heatable plate with cooking zones, said glass ceramic object comprising:

a glass ceramic material comprising a crystallized and ceramicized glass;

a glass coating disposed on said glass ceramic material;

said glass coating comprising less than 3% by weight calcium oxide, less than 5% by weight lithium oxide, and less than 1.5% by weight potassium oxide; and said glass ceramic material and said glass coating together having a mean tensile strength in bending which is maximized.

12. The glass ceramic object, such as a cooking surface for cooking food comprising a glass ceramic surface forming a heatable plate with cooking zones, according to claim 11, wherein:

said glass coating is free of lead and cadmium;

said glass coating comprises one of: a glaze, an enamel, and a decoration;

said glass coating has an abrasive resistance which is maximized;

said glass ceramic material has a coefficient of thermal expansion of less than $2 \times 10^{-6}/K$ at a temperature between 20° C. and 700° C.;

said glass coating further comprises (in % by weight):

| | |
|---|---|
| Na₂O | 0 to 5 |
| ΣLi₂O + Na₂O + K₂O | 2 to 12 |
| MgO | 0 to 4 |
| SrO | 0 to 4 |
| BaO | 0 to 1 |
| ZnO | 0 to 4 |
| Al₂O₃ | 3 to less than 10 |
| B₂O₃ | 13 to 23 |
| SiO₂ | 50 to 65 |
| TiO₂ | 0 to 4 |
| ZrO₂ | 0 to 4 |
| F | 0 to 4 | as replacement for oxygen; and up to 30% by weight of a firing-temperature-resistant pigment.

13. The glass ceramic object, such as a cooking surface for cooking food comprising a glass ceramic surface forming a heatable plate with cooking zones, according to claim 12, wherein said glass comprises (in % by weight):

| | |
|---|---|
| Li₂O | 1 to less than 5 |
| Na₂O | 0 to 5 |
| ΣLi₂O + Na₂O + K₂O | 2 to 10 |
| MgO | 0 to 3 |
| SrO | 0 to 4 |
| BaO | 0 to 1 |
| ZnO | 0 to 4 |
| Al₂O₃ | 5 to less than 10 |
| B₂O₃ | 14 to 23 |
| SiO₂ | 51 to 65 |
| TiO₂ | 0 to 3 |
| ZrO₂ | 0 to 3 |
| F | 0 to 3 | as replacement for oxygen; and up to 30% by weight of a firing-temperature-resistant pigment.

14. The glass ceramic object, such as a cooking surface for cooking food comprising a glass ceramic surface forming a heatable plate with cooking zones, according to claim 13, wherein said glass comprises (in % by weight):

| | |
|---|---|
| Li₂O | 3 to less than 5 |
| Na₂O | 0 to 4.5 |
| ΣLi₂O + Na₂O + K₂O | 3 to 10 |
| MgO | 0 to 2.5 |
| CaO | 0.5 to less than 3 |
| SrO | 0.5 to 3.5 |
| ZnO | 1.5 to 4 |
| Al₂O₃ | 5 to less than 10 |
| B₂O₃ | 18 to 23 |
| SiO₂ | 53 to 62 |
| TiO₂ | 0 to 3 |
| ZrO₂ | 0.5 to 2.5 |
| F | 0 to 2.5 | as replacement for oxygen; and up to 30% by weight of a firing-temperature-resistant pigment.

15. The glass ceramic object, such as a cooking surface for cooking food comprising a glass ceramic surface forming a heatable plate with cooking zones, according to claim 14 wherein:

said glass coating comprises at least one of the following oxides: $Sb_2O_3$, $SnO_2$, $La_2O_3$, $Bi_2O_3$ and $P_2O_5$; and said glass coating comprises up to 3% by weight of each of said $Sb_2O_3$, $SnO_2$, $La_2O_3$, $Bi_2O_3$ and $P_2O_5$ and less than 5% by weight of the sum of the percents of said $Sb_2O_3$, $SnO_2$, $La_2O_3$, $Bi_2O_3$ and $P_2O_5$.

16. The glass ceramic object, such as a cooking surface for cooking food comprising a glass ceramic surface forming a heatable plate with cooking zones, according to claim 15, wherein the sum of MgO+CaO+SrO+BaO is 1% to 9% by weight of said glass coating.

17. The glass ceramic object, such as a cooking surface for cooking food comprising a glass ceramic surface forming a heatable plate with cooking zones, according to claim 16, wherein said glass ceramic comprises, as the main crystal phase, at least one of: high-quartz crystals and keatite mixed crystals.

18. The glass ceramic object, such as a cooking surface for cooking food comprising a glass ceramic surface forming a heatable plate with cooking zones, according to claim 17, wherein:

said glass coating has a coefficient of thermal expansion $\alpha_{20/300° C.}$ in the range of one of: $3.5 \times 10^{-6}$/K to $8 \times 10^{-6}$/K and $4.0 \times 10^{-6}$/K to $7.5 \times 10^{-6}$/K;

said glass coating has a transition temperature in the range of one of: 400° C. to 650° C. and 425° C. to 590° C.;

said glass coating has a softening point in the range of one of: 580° C. to 830° C. and 600° C. to 780° C.; and said glass coating has a working point in the range of one of: 840° C. to 1100° C. and 850° C. to 1050° C.

19. The glass ceramic object, such as a cooking surface for cooking food comprising a glass ceramic surface forming a heatable plate with cooking zones, according to claim 18, wherein said glass coating has a mean particle size of one of: less than 10 μm and less than 5 μm.

20. The glass ceramic object, such as a cooking surface for cooking food comprising a glass ceramic surface forming a heatable plate with cooking zones, according to claim 19, wherein:

said glass coating has a thickness of one of: less than 9 μm and in the range of 1 μm to 7 μm;

said maximized mean tensile strength in bending of said glass-coated glass ceramic is greater than 30 megapascals; and said glass-coated glass ceramic which has a mean tensile strength in bending of greater than 30 megapascals for both of: a full-area decoration and a partial-area decoration.

* * * * *

UNITED STATES PATENT AND TRADEMARK OFFICE
CERTIFICATE OF CORRECTION

PATENT NO. : 6,525,300 B1
DATED : February 25, 2003
INVENTOR(S) : Ina Mitra et al.

It is certified that error appears in the above-identified patent and that said Letters Patent is hereby corrected as shown below:

<u>Title page,</u>
Item [75], Inventors, after "Krause," delete "Essingen" and insert -- Burrweiler --.

<u>Column 5,</u>
Line 31, after "have", delete "lowsusceptibility" and insert -- low susceptibility --.
Line 64, last line of table, after "4", insert -- as replacement for oxygen --.
Line 66, before "and", delete "as replacement for oxygen".

<u>Column 13,</u>
Table 2, under Example 14, Glass No. 2, after "wt.", delete "white$_{CN}$" and insert -- white$_{CM}$ --.
Line 41, last line of table, after "4", insert -- as replacement for oxygen --.
Line 44, before "and" delete "as replacement for oxygen".
Line 65, last line of table, after "3" insert -- as replacement for oxygen --.

<u>Column 14,</u>
Line 22, before "and" delete "as replacement for oxygen".
Line 40, last line of table, after "2.5" insert -- as replacement for oxygen --.
Line 42, before "and" delete "as replacement for oxygen".

<u>Column 17,</u>
Line 22, last line of table, after "0 to 4" insert -- as replacement for oxygen; --.
Lines 24, 44 and 65, before "and" delete "as replacement for oxygen;".
Line 42, last line of table, after "0 to 3" insert -- as replacement for oxygen; --.
Line 62, last line of table, after "0 to 2.5" insert -- as replacement for oxygen --.

<u>Column 18,</u>
Line 3, after "La$_2$O$_3$,", delete "Bi2O$_3$" and insert -- Bi$_2$O$_3$ --.

UNITED STATES PATENT AND TRADEMARK OFFICE
CERTIFICATE OF CORRECTION

PATENT NO.     : 6,525,300 B1
DATED          : February 25, 2003
INVENTOR(S)    : Ina Mitra et al.

It is certified that error appears in the above-identified patent and that said Letters Patent is hereby corrected as shown below:

Column 19,
Line 13, last line of table, after "0 to 4" insert -- as replacement for oxygen; --.
Lines 15, 35 and 56, before "and" delete "as replacement for oxygen;".
Line 34, last line of table, after "0 to 3" insert -- as replacement to oxygen; --.
Line 55, last line of table, after "0 to 2.5" insert -- as replacement for oxygen; --.

Signed and Sealed this

Twenty-ninth Day of July, 2003

JAMES E. ROGAN
*Director of the United States Patent and Trademark Office*